R. HODGSON.
FLUSHING TANK VALVE.
APPLICATION FILED OCT. 10, 1916.

1,223,170.

Patented Apr. 17, 1917.

WITNESSES
Edw. Thorpe

INVENTOR
Raymond Hodgson
BY
ATTORNEYS

UNITED STATES PATENT OFFICE.

RAYMOND HODGSON, OF NEW YORK, N. Y.

FLUSHING-TANK VALVE.

1,223,170.  Specification of Letters Patent.  Patented Apr. 17, 1917.

Application filed October 10, 1916. Serial No. 124,772.

*To all whom it may concern:*

Be it known that I, RAYMOND HODGSON, a citizen of the United States, and a resident of the city of New York, Elm Park, borough of Richmond, in the county of Richmond and State of New York, have invented a new and Improved Flushing-Tank Valve, of which the following is a full, clear, and exact description.

Among the principal objects which the present invention has in view are: to provide an inlet valve having a seat located outside the tank and removable therefrom; to avoid leakage of valves used in connection with a flushing tank; and to simplify the construction of valves of the character mentioned.

*Drawings.*

*Description.*

Figure 1:
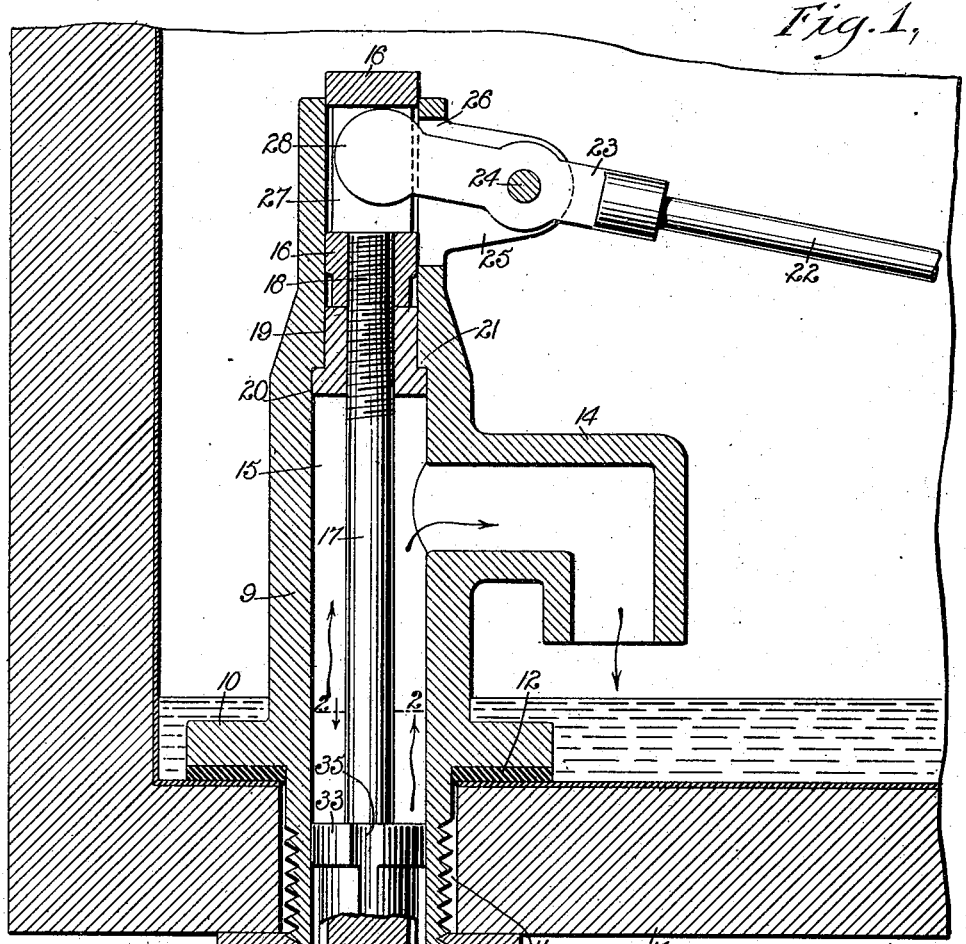
Figure 1 is a vertical section of a valve constructed and arranged in accordance with the present invention and mounting therefor, the section being taken as on the median plane of said valve.
Figure 2:
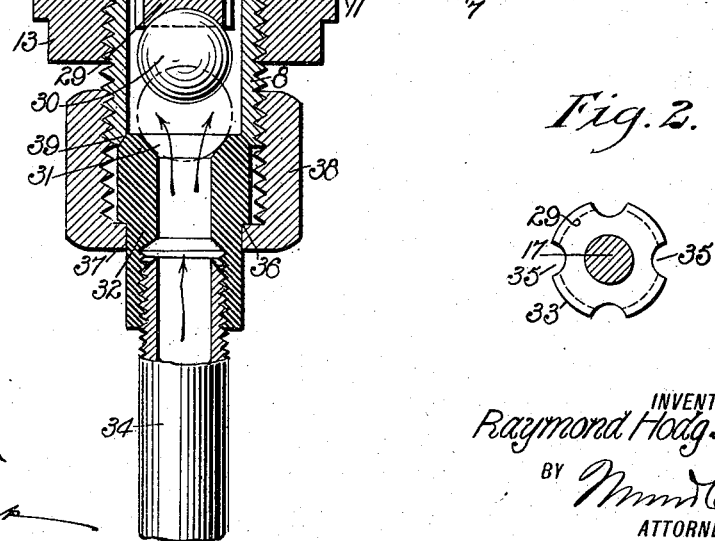
Fig. 2 is a cross section of the valve plunger stem, the section being taken as on the line 2—2 in Fig. 1.

As seen in the drawings, a flushing tank 7 when equipped with a valve constructed and arranged in accordance with the present invention, has a perforation through which protrudes the threaded extension 8 of a faucet 9. The faucet 9 is provided with a seating flange 10, the diameter of which is greater than that of the perforation 11 above referred to and is used for clamping a gasket 12 between said flange and the bottom of the tank 7 to prevent the seepage of water from said tank through said perforation. The flange 10 is drawn tightly toward the floor of the tank 7 by a nut 13, the threads of which match the threads of the extension 8.

The faucet 9 is provided with a laterally-extending spigot 14, the delivery end whereof is in service turned toward the floor of the tank 7. The passage through the spigot 14 communicates with the central bore 15 of the faucet 9. Above the junction of the opening of the passage through the spigot 14 and the bore 15, the latter is diminished to form a guideway for the head 16 to which is connected a valve stem 17.

The connection between the head 16 and stem 17 is formed by the threaded extension 18 of the said stem. The threads of the extension 18 are also engaged by the threads of a nut 19. The nut 19 has a flange 20 to engage the abutment 21 between the larger and smaller portions of the bore 15 of the faucet 9. The flange 20 operates in service to limit the lift of the stem 17. It also operates to regulate the lowered position of a float with which the float rod 22 is usually provided.

The float rod 22 is joined to a lever 23 which has a pivot pin 24, the ends whereof are provided with bearings in two lugs 25 extended from the faucet 9 adjacent an opening 26. The opening 26 is in service alined with a slot 27 in the head 16, the office of which is to receive the disk 28 at the inner end of the lever 23. The disk 28 forms a rounded bearing surface which engages the ends of the slot 27 to elevate and depress the head 16 and stem 17 connected therewith.

The purpose in adjusting the stem 17 in the head 16 is to insure the necessary flotation of pressure on the ball valve 30 when the same is pressed upon the valve seat 31 formed in the end of the coupling 32 and to accommodate various levels of water in the tank. The foot 29 is provided with a guide flange 33, the diameter of which is such as to fit the bore 15 of the faucet 9. To provide passages for the water entering the bore 15 from the supply pipe 34, the flange 33 has a series of grooves 35 formed therein.

One of the principal objects attained by the employment of a valve constructed and arranged in accordance with the present invention is that the valve and valve seat may be removed without disturbing the installation of the faucet 9, float rod 22, and parts connected therewith. To this end the coupling 32 wherein the seat 31 is formed, is provided with a shoulder 36 which is engaged by the flange 37 of a gland nut 38. The threads of the gland nut 38 engage the threads of the extension 8 and when manipulated to that end draw the coupling 32 and the tapered end 39 thereof into intimate contact with the internally coned end of the extension 8, thus sealing by the joint effected and by the joint between the flange 37 and the abutment 36, the passage of water through the said nut 38, The rear end of the coupling 36 is properly bored and tapped to receive the threaded end of the supply pipe 34.

When thus constructed and arranged, it is obvious that the level of the water in the tank 7 may be determined by arranging the float and the rod 22 to which the same is attached at the desired level. Then by manipulating the head 16 and nut 19, the stem 17 and foot 29 connected therewith are so arranged that at the predetermined level of said float, the ball valve 30 is pressed home on the seat 31. This having been effected, the coupling 32 is drawn rigidly into position by manipulating the nut 38.

When the float referred to is depressed, the head 16, rod 17 and foot 29 connected therewith are lifted to permit the pressure of the water in the pipe 34 and coupling 32 to lift the ball 30. The water then flows through the passages 35 in the flange 33 through the bore 15 and spigot 14 to the tank 7.

When the level of the water lifts the said float and rod 22 connected therewith, the disk 28 bears on the lower wall of the slot 27 and depresses the stem 17 and foot 29 until the ball 30 is pressed firmly on the seat 31. It is obvious that as the ball 30 is moved, it revolves so that at each operation of seating the same a relatively different surface is presented to the seat 31 from that which rested thereon at each previous seating. In this manner the wear of the valve seat incidental to leakage of the valve is avoided. Likewise the necessity for the employ of a soft yielding packing or valve employing the same is avoided. A perfect closure is then effected by the use of the ball 30 and the seat 31 provided therefor.

When in the event it becomes necessary to replace the ball 30 or repair the seat 31, this is effected quickly and readily by loosening the nut 38, care having been taken to previously shut off the supply of water from the pipe 34 and to drain the water from the tank 7 below the entrance to the spigot 14.

With the removal of the nut 38, it is obvious that the flange 37 may be slipped below the reduced end of the coupling 32, which then may be unscrewed from the pipe 34 to be repaired and replaced or substituted by another coupling, or if it be the substitution of the ball 30 which is to be effected, this may be accomplished by removing the coupling 32 sufficiently to allow the ball 30 to pass out of the lower end of the bore 15. The ball having been replaced or the repair of the seat having been effected, the coupling 32 is adjusted to position and the nut 38 is set up on the extension 8.

*Claim.*

In combination with a liquid-holding tank having a perforation in the bottom thereof; a hollow-bodied faucet having a supporting flange and an extension, said extension being adapted to protrude beyond said tank when said flange is resting on the floor thereof; a supply pipe having rigidly connected therewith an upwardly-turned valve seat at the end thereof; means for operatively connecting the extension of said faucet and said supply pipe, said means embodying a screw-threaded member operatively engaging both said extension and said supply pipe; a ball valve loosely mounted on said valve seat for closing the entrance thereto; a plunger adapted to rest on said ball for holding the same on said seat, a float-operated lever pivoted intermediate its ends and having its inner end disposed above said plunger, a valve stem connected to said plunger, adjusting means connecting said lever and stem to vary the operative height of the outer end of the lever; and means for arresting the lift of said valve stem, said means embodying an abutment adjacent the upper end of said faucet, and an adjusting nut engaging said stem and provided with a flange for engaging said abutment.

RAYMOND HODGSON.

Copies of this patent may be obtained for five cents each, by addressing the "Commissioner of Patents, Washington, D. C."